US012632562B2

(12) United States Patent
Gehtman et al.

(10) Patent No.: US 12,632,562 B2
(45) Date of Patent: May 19, 2026

(54) SYSTEM AND METHOD FOR SELECTIVE MANAGEMENT OF VULNERABILITIES

(71) Applicant: Dell Products L.P., Round Rock, TX (US)

(72) Inventors: Yevgeni Gehtman, Modi'in (IL); Tomer Shachar, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 18/302,281

(22) Filed: Apr. 18, 2023

(65) Prior Publication Data

US 2024/0354419 A1    Oct. 24, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ..................... G06F 21/577; G06F 2221/034
See application file for complete search history.

(56) References Cited

U.S. PATENT DOCUMENTS

| | | | | |
|---|---|---|---|---|
| 11,140,193 B2* | 10/2021 | Patel | ..................... | G06F 21/577 |
| 11,637,855 B2* | 4/2023 | Shua | ................... | G06F 9/45558 |
| | | | | 726/25 |
| 2005/0066195 A1* | 3/2005 | Jones | .................... | G06F 21/577 |
| | | | | 726/4 |
| 2020/0120126 A1* | 4/2020 | Ocepek | .............. | H04L 63/1433 |
| 2022/0150271 A1* | 5/2022 | Shah | ........................ | G06N 3/08 |
| 2023/0115473 A1* | 4/2023 | Aronovich | ........... | G06F 9/5022 |
| | | | | 718/105 |
| 2023/0185921 A1* | 6/2023 | Karas | .................... | G06F 21/577 |
| | | | | 726/25 |
| 2023/0376605 A1* | 11/2023 | Maheshwari | ......... | G06F 21/577 |
| 2025/0036777 A1* | 1/2025 | Cameron | .............. | G06F 21/577 |
| 2025/0227497 A1* | 7/2025 | Li | ......................... | H04W 24/10 |

* cited by examiner

*Primary Examiner* — Linglan Edwards
*Assistant Examiner* — Jacob Benedict Knackstedt
(74) *Attorney, Agent, or Firm* — WOMBLE BOND DICKINSON (US) LLP

(57)    ABSTRACT

Methods and systems for managing vulnerabilities that may be exhibited by data processing systems are disclosed. The vulnerabilities may be managed by identifying components of the data processing systems and conditions impacting the data processing systems. The conditions may be used to establish a hierarchy for the vulnerabilities. Remediation for the vulnerabilities may be selectively performed based on the locations of the vulnerabilities within the hierarchy.

20 Claims, 5 Drawing Sheets

SYSTEM AND METHOD FOR SELECTIVE MANAGEMENT OF VULNERABILITIES

FIELD

Embodiments disclosed herein relate generally to vulnerability management. More particularly, embodiments disclosed herein relate to systems and methods to manage vulnerabilities based on conditions.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
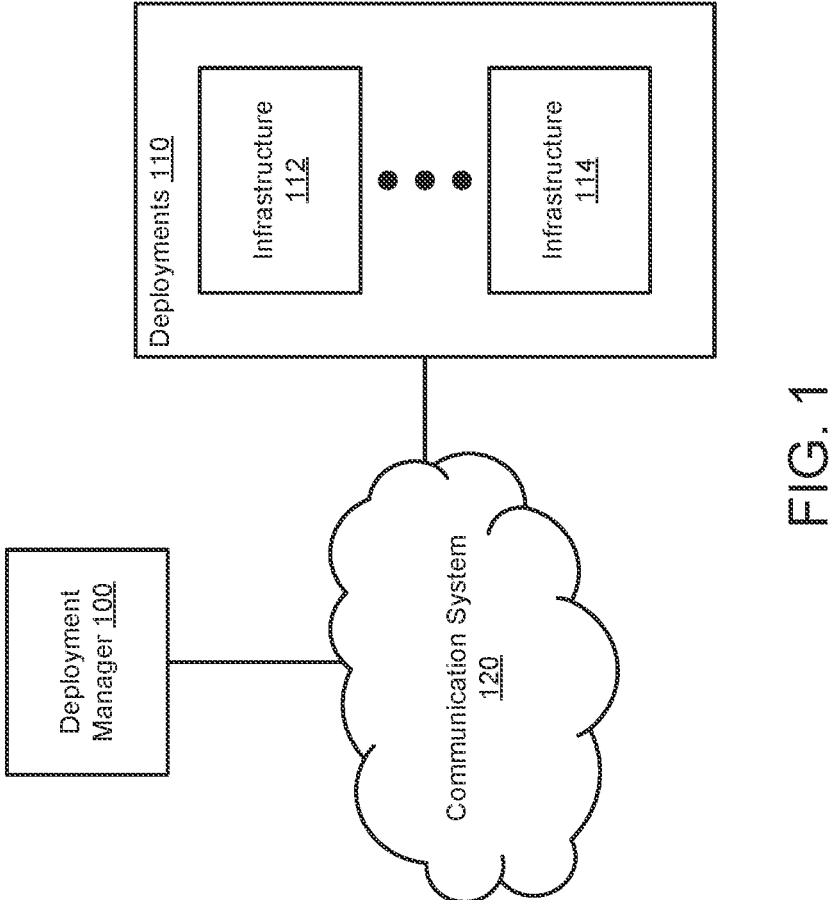
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing vulnerabilities that may be exhibited by data processing systems. To manage the vulnerabilities, components of the data processing systems may be identified. Once identified, potentially exploitable vulnerabilities may be identified.

Conditions impacting the data processing systems. The conditions may be used to classify the potentially exploitable vulnerabilities into different groups. The groups may establish a hierarchy for the potentially exploitable vulnerabilities.

Remediations for the data processing systems may be performed based on the hierarchy of the potentially exploitable vulnerabilities. The hierarchy may be used to establish a priority or ranking for attempting to different potentially exploitable vulnerabilities. The priority or ranking may then be used to select some of the potentially exploitable vulnerabilities to be remediated, and others to not be remediated.

By doing so, embodiments disclosed herein may more efficiently marshal limited computing resources to provide both primary functionalities of data processing systems while also managing vulnerabilities that may be exhibited by the data processing systems.

In an embodiment, a method for managing deployments is provided. The method may include identifying infrastructure of the deployments for vulnerability analysis; identifying components of the infrastructure; identifying conditionally exploitable vulnerabilities for the components; identifying conditions of the infrastructure based on the conditionally exploitable vulnerabilities for the components; classifying the conditionally exploitable vulnerabilities based on the conditions of the infrastructure to obtain an exploitable vulnerabilities hierarchy for the infrastructure; and performing a remediation for the infrastructure based on the exploitable vulnerabilities hierarchy.

The conditionally exploitable vulnerabilities may be vulnerabilities presented (e.g., or likely to be presented) by the components when corresponding conditions are met.

The corresponding conditions may include at least one selected from a group consisting of: a version of one of the components of the infrastructure; presence of a type of a component of the infrastructure; presence of a type of user environment of the infrastructure; presence of a version of a user environment of the infrastructure; and presence of a collection of types of components of the infrastructure.

Classifying the conditionally exploitable vulnerabilities may include adding each conditionally exploitable vulnerability of the conditionally exploitable vulnerabilities to one of three groups, the three groups may include exploitable vulnerabilities exhibited by the infrastructure; potentially exploitable vulnerabilities exhibited by the infrastructure; and unexploitable vulnerabilities exhibited by the infrastructure.

The conditionally exploitable vulnerabilities that are grouped in the exploitable vulnerabilities group of the three groups may be known to be exploitable.

The conditionally exploitable vulnerabilities that are grouped in the potentially exploitable vulnerabilities group of the three groups may be neither known to be exploitable and known to not be exploitable. The conditionally exploitable vulnerabilities may be grouped in the potentially exploitable vulnerabilities group of the three groups due to lack of information regarding the conditions of the infrastructure necessary for a definitive determination regarding exploitability.

The conditionally exploitable vulnerabilities that are grouped in the unexploitable vulnerabilities group of the three groups may be known to not be exploitable.

Performing the vulnerability analysis using the second component inventory to identify a second at least one vulnerability may include for each component specified by the third component list: matching at least one of a type of the component, and a version of the component against vulnerabilities in a vulnerability repository to identify the second at least one vulnerability.

In an embodiment, a non-transitory computer readable media (e.g., a machine readable medium) is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system of FIG. 1 may include deployments 110. A deployment may include collections of various infrastructure 112, 114. Infrastructure may include any number of data processing systems that may provide all or a portion of the computer implemented services (e.g., cooperatively and/or independently). Different infrastructure and deployments may provide similar or different computer implemented services.

To provide the computer implemented services, deployments 110 may be operably connected to various networks including, for example, the Internet. These connections may present risk to any of the data processing systems. For example, a malicious entity may attempt to compromise any of the data processing systems using these connections and/or other means.

To compromise the data processing systems, the malicious entities may utilize various hardware and/or software based vulnerabilities. While generally implementing various security management frameworks, these vulnerabilities may bypass the protections provided by these frameworks.

To reduce the likelihood of any of the components of deployments 110 from being compromised, the components of the deployments 110 may need to be periodically analyzed (e.g., against known vulnerabilities that may be discovered overtime). Various remediations may then be performed based on the vulnerabilities to limit the impact of compromise and/or prevent compromise via the identified and remediated vulnerabilities.

However, performing remediations may consume resources. For example, the remediations may include initiating various actions by components of a deployments. These actions may prevent or limit the ability of the deployments to provide desired computer implemented services (e.g., due to resource consumption for the remediation).

To identify the vulnerabilities, information regarding the components of deployments 110 may be used. For example, types of components, workloads being performed, configurations, versions, and/or other types of information regarding these components may be used to identify whether the components present vulnerabilities. As new vulnerabilities are identified, associations to similar information regarding the components may be established such that lookups or other types of processing operations may be performed based on the information to identify whether corresponding vulnerabilities for the components exist.

In general, embodiments disclosed herein may provide methods, systems, and/or devices for identifying and/or initiating remediations for vulnerabilities in deployments with reduced levels of interference with other functions provided by data processing systems. The vulnerabilities may be identified by collecting both (i) information regarding components of deployments and known vulnerabilities of components, and (ii) conditions for the vulnerabilities to be exhibited and conditions exhibited by the deployments. The collected information may be used to classify known vulnerabilities of components of the deployments based on conditions for the vulnerabilities to be exhibited and whether the deployment exhibits the conditions for the vulnerabilities. The resulting classifications may establish a hierarchy of vulnerabilities of the deployments that may be used to granularly define an implement remediations for the infrastructure. By granularly defining the remediations based on the hierarchy, the resulting remediations may be less likely to include actions that are unlikely to manage vulnerabilities that are actually exploitable. Consequently, fewer resources may be likely to be expended for actions that are unlikely to provide tangible benefits to the security of the deployments. Accordingly, the limited resources of the deployments and/ or other systems may be more efficiently marshaled to manage the security of the deployments as well as provide desired computer implemented services.

To provide the above noted functionality, the system of FIG. 1 may include deployment manager 100, deployments 110, and communication system 120. Each of these components is discussed below.

Figure 2A:
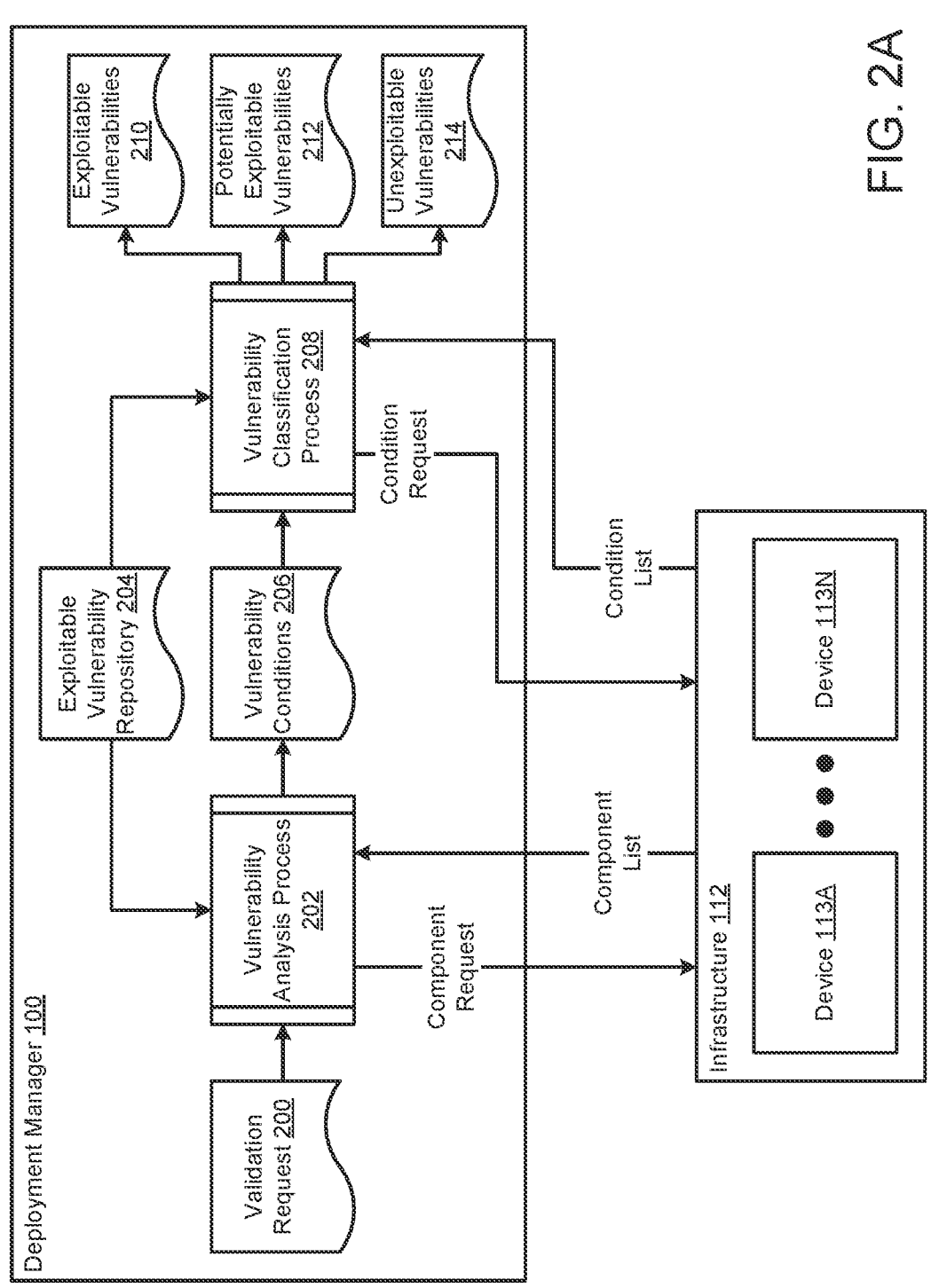
FIGS. 2A-2B show diagrams illustrating data flows in accordance with an embodiment.
Figure 2B:
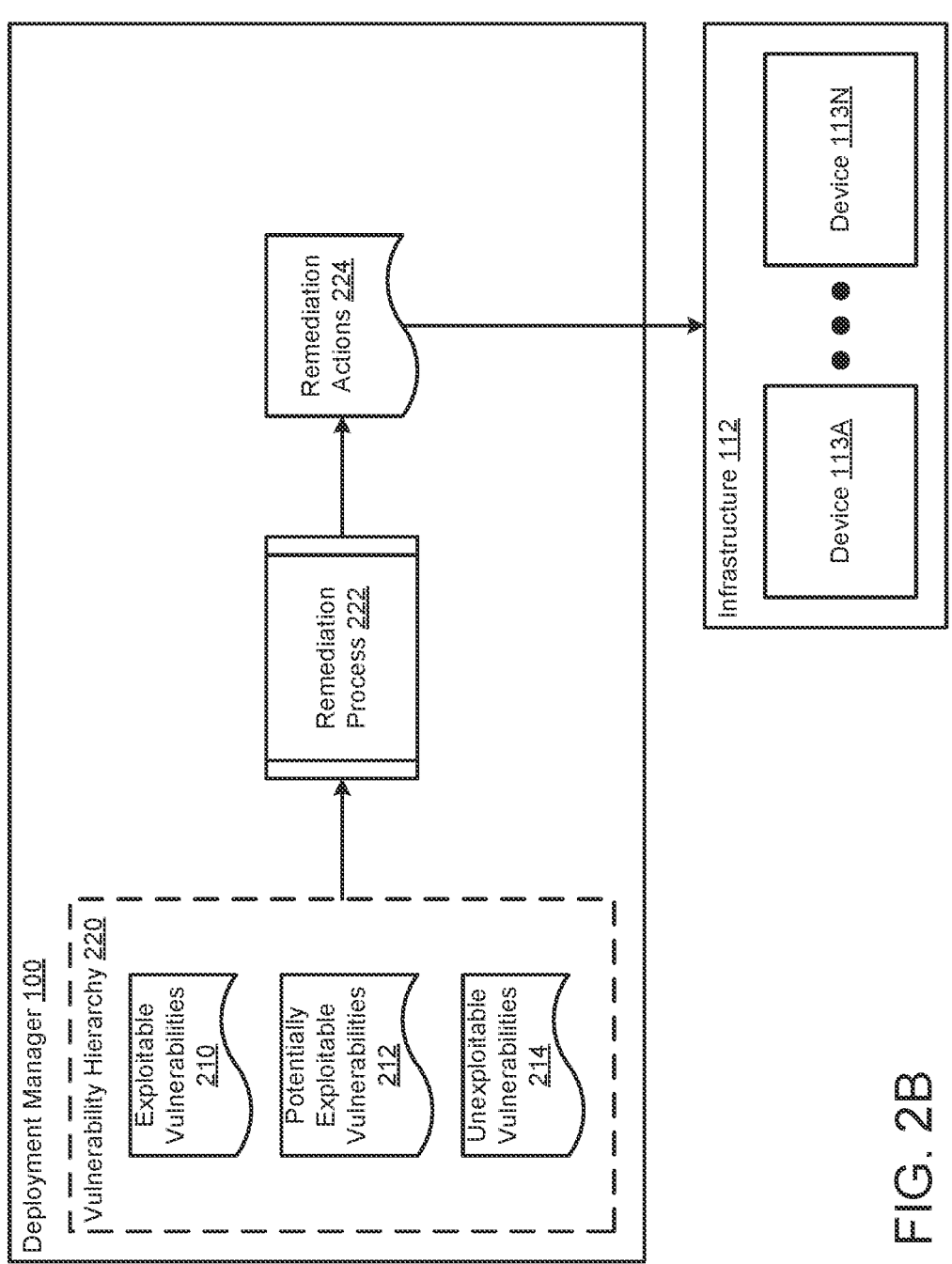

Deployment manager 100 may manage vulnerabilities presented by deployments 110. To do so, deployment manager 100 may (i) establish vulnerability hierarchies for deployments 110 (or portions thereof), and (ii) initiate remediations using the vulnerability hierarchies to manage vulnerabilities exhibited by deployments 110. Refer to FIGS. 2A-2B for additional details regarding management of vulnerabilities.

Deployments 110 may include any number of collections of infrastructure 112-114. The deployments may provide various computer implemented services. Different infrastructure may include different types of data processing systems having different components and/or conditions impacting the components.

To reduce the likelihood of compromise, deployment manager 100 may monitor and/or initiate remediations for the infrastructure. Deployment manager 100 may select how to perform remediations by classifying different conditional potential vulnerabilities that may be exhibited by components of the infrastructure based on conditions present in the infrastructure. By doing so, deployment manager 100 may be less likely to initiate actions for remediation that are unlikely to address actual vulnerabilities of the infrastructure.

Figure 3:
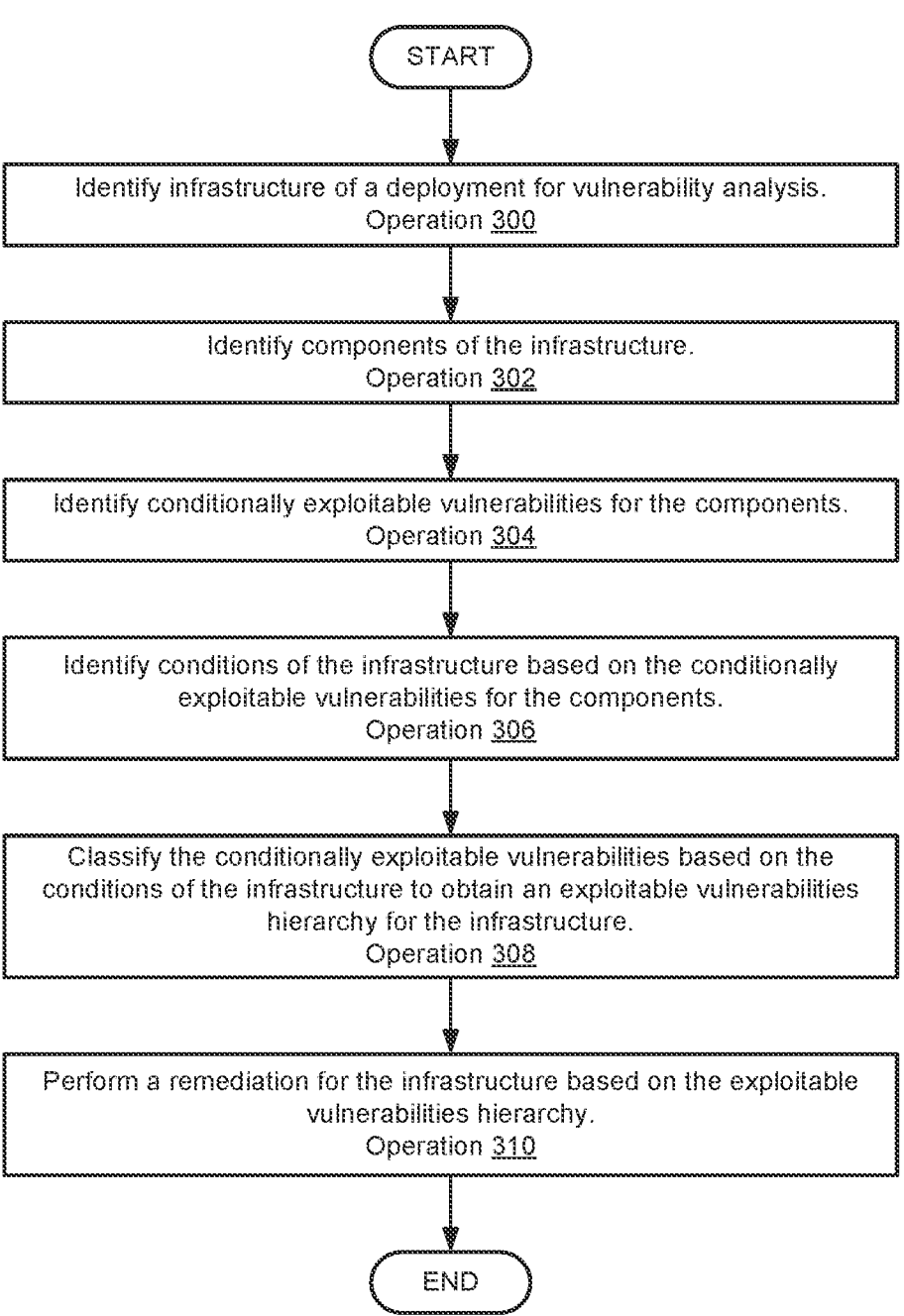
FIG. 3 shows a flow diagram illustrating a method in accordance with an embodiment.

When providing their functionality, any of deployment manager 100 and deployments 110 may perform all, or a portion, of the method illustrated in FIG. 3.

Any of deployment manager 100 and deployments 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, deployment manager 100 may facilitate management of infrastructure. FIGS. 2A-2B show data flow diagrams in accordance with embodiments that illustrate data flows that may occur while infrastructure is managed based on vulnerabilities of the infrastructure.

Turning to FIG. 2A, a first data flow diagram illustrating data flows, data processing, and/or other operations that may be performed by the system of FIG. 1 in accordance with an embodiment is shown. The first data flow diagram may illustrate data flows that may occur when a vulnerability hierarchy for infrastructure 112 is obtained. In FIG. 2A, a first set of shapes (e.g., 200, 206, 210, 212, 214) is used to represent data structures, a second set of shapes (e.g., 202, 208) is used to represent processes performed using data, and a third set of shapes (e.g., 100, 112-115B) is used to represent physical devices that may host the data and processes.

To initiate management of infrastructure 112, deployment manager 100 may obtain validation request 200. Validation request 200 may be a request to validate whether vulnerabilities exist in infrastructure 112.

Infrastructure 112, in this example, may include devices (e.g., 113A-113N) that may include components which may or may not exhibit vulnerabilities depending on the conditions impacting the components.

Once obtained, validation request 200 may be used during vulnerability analysis process 202 to identify vulnerability conditions 206 for infrastructure 112. During vulnerability analysis process 202, components of infrastructure 112 may be identified via (i) a scanning process for infrastructure 112 during which a component request may be sent to infrastructure 112 and/or (ii) use of previously obtain and stored components inventories (e.g., stored in a repository or other data structure, not shown).

If obtained via scanning, the component request may be a request for information regarding the components of infrastructure 112. Once received, agents or other entities hosted by infrastructure 112, and/or components thereof, may perform various actions (e.g., thereby consuming computing resources) to verify, validate, and/or otherwise identify components of infrastructure 112 that may exhibit various vulnerabilities, depending on the conditions that exist within infrastructure 112. For example, an agent may perform an inventory process to identify various components, validate the components, etc. The agents may provide a component list or other representation of the identified components to deployment manager 100.

If obtained using stored data, the component list may be read from storage.

Once obtained, vulnerability analysis process 202 may evaluate the identified components using exploitable vulnerability repository 204. Exploitable vulnerability repository 204 may include information usable to identify (i)

vulnerabilities for components and (ii) conditions under which the components exhibit the vulnerabilities. For example, exploitable vulnerability repository 204 may associate component types, versions, and/or other component characteristics with various vulnerabilities and conditions for the vulnerabilities to be exhibited. The associations may be used to identify the (i) vulnerabilities that may be exhibited by infrastructure 112, and components thereof, and (ii) necessary conditions for the vulnerabilities to be exhibited (if known). For example, lookups may be performed using the information included in the component list as a key to identify corresponding vulnerabilities (if present) and conditions for the vulnerabilities. The content of exploitable vulnerability repository 204 may be established by a subject matter expert, through automated analysis, and/or via other processes. The lookup may return a list of conditions for vulnerabilities which may be exhibited by components of infrastructure 112 (e.g., vulnerability conditions may specify components, vulnerabilities that may be exhibited by the components, and conditions for the vulnerabilities to be exhibited).

Once identified, vulnerability conditions 206 may indicate the conditions under which infrastructure 112 will exhibit vulnerabilities. Vulnerability conditions 206 may be used as a basis vulnerability classification process 208. During vulnerability classification process 208, (i) conditions of infrastructure 112 may be identified (e.g., similarly to how the component list was identified, either through active querying or use of already obtained information regarding the conditions of infrastructure 112), and (ii) each vulnerability that may be exhibited by the components of infrastructure 112 may be classified into a group. The vulnerabilities may be classified based on (i) whether the conditions for the vulnerability exist in infrastructure 112 (e.g., classified as exploitable vulnerabilities 210), (ii) whether the conditions for the vulnerability do not exist in infrastructure 112 (e.g., classified as unexploitable vulnerabilities 214), or (iii) whether insufficient information is available to ascertain whether a vulnerability is likely to be exhibited (e.g., classified as potentially exploitable vulnerabilities). The resulting groupings of the vulnerabilities may establish a hierarchy of vulnerabilities. Refer to FIG. 2B for additional details regarding the vulnerability hierarchy.

Turning to FIG. 2B, a second data flow diagram illustrating data flows, data processing, and/or other operations that may be performed by the system of FIG. 1 in accordance with an embodiment is shown. The second data flow diagram may illustrate data flows that may occur when a vulnerability hierarchy (e.g., 220) is available to manage infrastructure 112. In FIG. 2B, a first set of shapes (e.g., 210, 212, 214, 220, 224) is used to represent data structures, a second set of shapes (e.g., 222) is used to represent processes performed using data, and a third set of shapes (e.g., 100, 112-113B) is used to represent physical devices that may host the data and processes.

The groupings of vulnerabilities discussed with respect to FIG. 2A may be used to obtain vulnerability hierarchy 220. Vulnerability hierarchy may establish a hierarchy of risk presented by vulnerabilities that may be exhibited infrastructure 112. Exploitable vulnerabilities 210 may present a highest level of risk because the conditions known to have previously caused vulnerabilities to be expressed are present in infrastructure 112 and components that may express these vulnerabilities are also known to be present in infrastructure 112.

Potentially exploitable vulnerabilities 212 may present a moderate level of risk because components that may express these vulnerabilities are also known to be present in infrastructure 112 but it is not known whether all of the conditions known to have previously caused these vulnerabilities to be expressed are present in infrastructure 112. Thus, the likelihood of these vulnerabilities being exhibited by infrastructure 112 may lower than that of vulnerabilities classified as exploitable vulnerabilities 210.

Unexploitable vulnerabilities 214 may present a lower level of risk because components that may express these vulnerabilities are also known to be present in infrastructure 112 but is known that at least some of the conditions known to have previously caused these vulnerabilities to be expressed are not present in infrastructure 112. Thus, the likelihood of these vulnerabilities being exhibited by infrastructure 112 may lower than that of vulnerabilities classified as both potentially exploitable vulnerabilities 212 and exploitable vulnerabilities 210.

Vulnerabilities hierarchy 220 may be used to drive remediation process 222. During remediation process 222, (i) reports based on vulnerabilities hierarchy 220 may be generated and/or provided to various entities (e.g., administrators, stored in repositories, etc.), (ii) actions intended to manage the exhibited vulnerabilities may be selectively performed (and/or initiated), and/or other actions may be performed to manage the identified vulnerabilities of infrastructure 112. Through proactive management, the likelihood of the vulnerabilities being exploited by malicious parties or otherwise causing other issues may be reduced.

However, as noted above, infrastructure 112 and/or other entities may have limited resources. To balance the resource cost for performing various remediation actions 224 (e.g., report generation, actions to be performed by infrastructure and/or other components) against the potential benefits, the relative risk presented by different vulnerabilities in vulnerability hierarchy 220 may be used to select which actions to perform.

For example, during remediation process 222, actions that may be performed to address vulnerabilities specified by vulnerabilities hierarchy 220 may be identified. The actions may then be rank ordered based on the corresponding portions of the vulnerabilities in the hierarchy. Some of the actions may then be selected for performance based on the rank ordering, and others may be excluded from being performed. The number of actions selected may be based on (i) the quantity of available computing resources and the quantity of computing resources likely to be available in the future for performing remediation actions, (ii) the level of risk which an operation of infrastructure 112 is will to tolerate (e.g., may perform all remediation actions associated with vulnerabilities in certain groups, and may only perform remediation actions associated with vulnerabilities in other groups as resources allow, etc.), and/or other factors. Thus, the specific remediation actions may be customized to the posture of infrastructure 112, as well as level of risk tolerance of an operation of infrastructure 112.

As discussed above, the components of FIG. 1 may perform various methods to manage operation of infrastructure through identification and management of vulnerabilities that may be exhibited depending on conditions present in the infrastructure. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing vulnerabilities in accordance with an embodiment is shown. The method may be performed by any of deployment manager 100, deployments 110, and/or other components of the system shown in FIG. 1.

At operation 300, infrastructure of a deployment is identified for vulnerability analysis. The infrastructure may be identified by reading a request for performing an analysis of the infrastructure for vulnerabilities. The infrastructure may include components which may exhibit vulnerabilities depending on the conditions present in the infrastructure.

At operation 302, components of the infrastructure are identified. The components may be identified via active scanning for the components or by reading previously obtained information regarding the infrastructure from storage.

At operation 304, conditionally exploitable vulnerabilities for the components are identified. The conditionally exploitable vulnerabilities may be identified by performing a lookup or other processing operation in a data structure. The lookup may return the conditionally exploitable vulnerabilities. The conditionally exploitable vulnerabilities may specify vulnerabilities and conditions that when met make it likely that the vulnerabilities are exploitable.

The conditions may include, for example, (i) a version of one of the components of the infrastructure; (ii) presence of a type of a component of the infrastructure; (iii) presence of a type of user environment of the infrastructure; (iv) presence of a version of a user environment of the infrastructure; (v) presence of a collection of types of components of the infrastructure; and/or other types of conditions.

At operation 306, conditions of the infrastructure are identified based on the conditionally exploitable vulnerabilities for the components. The conditions of the infrastructure may be identified similarly to how the components of the infrastructure are identified (e.g., by scanning or reading previously obtained information). The conditions of the infrastructure may be conditions specified by the conditions specified by the conditionally exploitable vulnerabilities.

At operation 308, the conditionally exploitable vulnerabilities are classified based on the infrastructure to obtain an exploitable vulnerabilities hierarchy for the infrastructure. The conditionally exploitable vulnerabilities may be classified by adding each conditionally exploitable vulnerability of the conditionally exploitable vulnerabilities to one of three (or a different number of) groups. The three groups may include (i) an exploitable vulnerabilities exhibited by the infrastructure group, (ii) a potentially exploitable vulnerabilities exhibited by the infrastructure group, and (iii) an unexploitable vulnerabilities exhibited by the infrastructure group. The adding may be done based on the extent of matching of the conditions of the infrastructure to the conditions specified by the conditionally exploitable vulnerabilities.

The conditionally exploitable vulnerabilities that are grouped in the exploitable vulnerabilities group of the three groups may be known to be exploitable (e.g., at least within the available information on which the grouping decision is made).

The conditionally exploitable vulnerabilities that are grouped in the potentially exploitable vulnerabilities group of the three groups may neither known to be exploitable and known to not be exploitable (e.g., at least within the available information on which the grouping decision is made). The conditionally exploitable vulnerabilities may be grouped in the potentially exploitable vulnerabilities group of the three groups due to lack of information regarding the conditions of the infrastructure necessary for a definitive determination regarding exploitability.

The conditionally exploitable vulnerabilities that are grouped in the unexploitable vulnerabilities group of the three groups may be known to not be exploitable (e.g., at least within the available information on which the grouping decision is made).

At operation 310, a remediation for the infrastructure is performed based on the exploitable vulnerabilities hierarchy. The remediation may be performed by performing one or more actions which may include (i) generating and/or sending reports based on vulnerabilities hierarchy (e.g., to administrators or other entities that assist in managing the infrastructure), (ii) initiating performance of any number and types of actions (e.g., by the infrastructure and/or other entities) to manage an impact of the vulnerabilities in the vulnerabilities hierarchy, and/or by performing other types of actions.

The one or more actions may also be selected based on the rankings of the vulnerabilities established by the hierarchy and/or computing resource limitations. The rankings may be used to select for which of the vulnerabilities actions will be taken, and/or the types of actions taken. For example, the rankings may be used to identify potential actions that may be taken to manage the vulnerabilities, computing resource costs for performing the actions may be identified, and some of the actions may be selected based on the computing resource costs and computing resource limitations (e.g., of the infrastructure and/or other entities that may participate in the remediation).

The method may end following operation 310.

Figure 4:
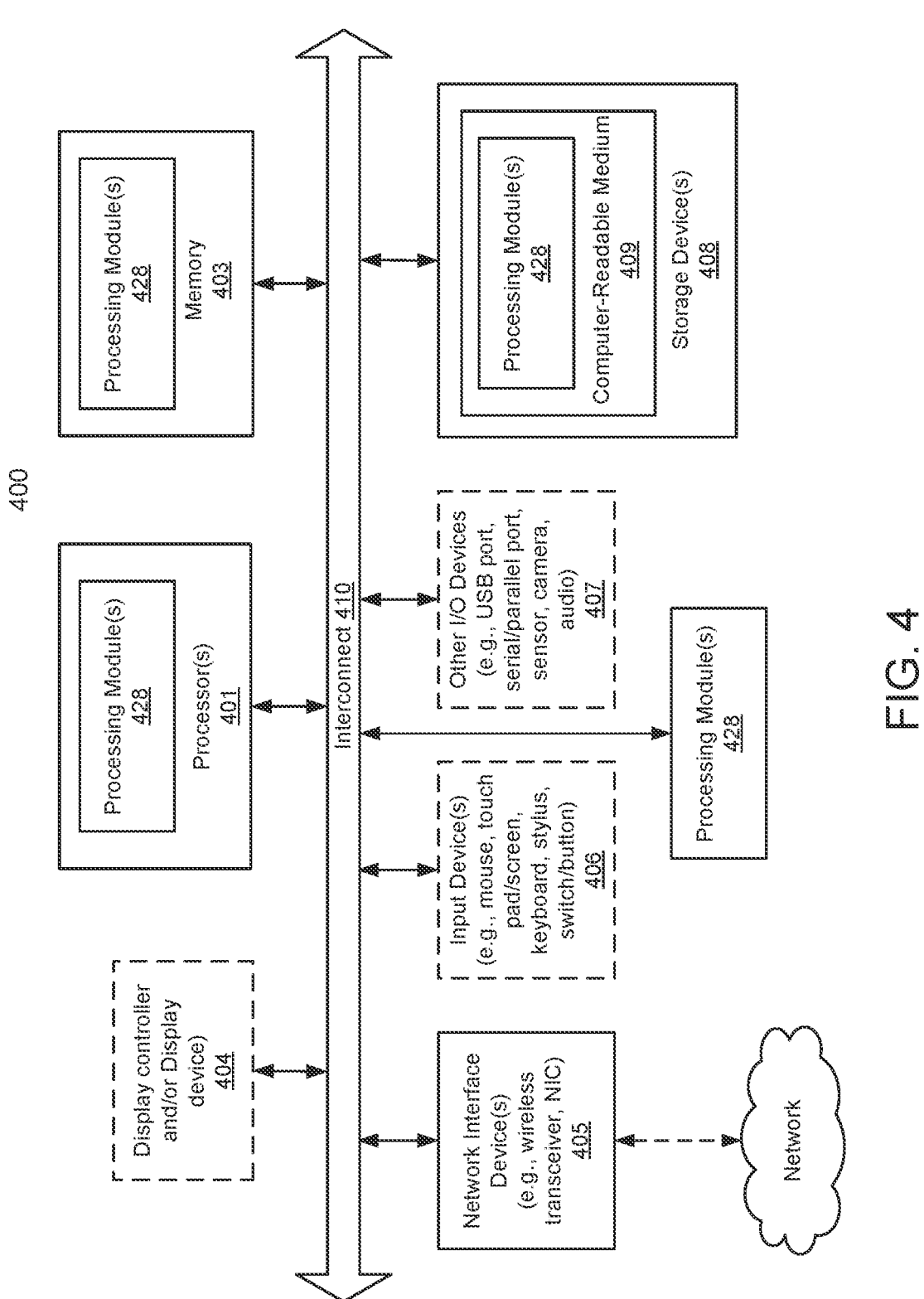
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing deployments, the method being performed by a deployment manager and comprising:

identifying an infrastructure of the deployments for vulnerability analysis;

identifying components of the infrastructure;

identifying conditionally exploitable vulnerabilities based on the components;

identifying conditions of the infrastructure based on the conditionally exploitable vulnerabilities for the components;

classifying the conditionally exploitable vulnerabilities based on the conditions of the infrastructure to obtain an exploitable vulnerabilities hierarchy for the infrastructure by adding each conditionally exploitable vulnerability of the conditionally exploitable vulnerabilities to one of three groups, the three groups comprising:

exploitable vulnerabilities exhibited by the infrastructure;

potentially exploitable vulnerabilities exhibited by the infrastructure; and unexploitable vulnerabilities exhibited by the infrastructure; and performing, using the deployments, a remediation for the infrastructure based on the exploitable vulnerabilities hierarchy, wherein the remediation is performed based on the exploitable vulnerabilities hierarchy for the deployment manager to exclude performance of one or more actions that waste limited computing resources of the deployments and the deployment manager as a result of the one or more actions being determined by the deployment manager, via using the exploitable vulnerabilities hierarchy and information available for use by the deployment manager during the classifying, as being unlikely to prevent at least one of the conditionally exploitable vulnerabilities within the exploitable vulnerabilities hierarchy from being exploited, wherein the one or more actions that are excluded for the remediation are associated with at least the conditionally exploitable vulnerabilities classified as the unexploitable vulnerabilities exhibited by the infrastructure, wherein a level of risk tolerance, for the infrastructure of the deployments, specifies one or more of the three groups that an entity associated with the infrastructure is willing to tolerate from being exploited, and wherein the deployment manager determines a number of actions to be executed in the remediation based on the level of the risk tolerance.

2. The method of claim 1, wherein the conditionally exploitable vulnerabilities are vulnerabilities presented by the components when corresponding conditions are met.

3. The method of claim 2, wherein the corresponding conditions comprise at least one selected from a group consisting of:

a version of one of the components of the infrastructure;

presence of a type of a component of the infrastructure;

presence of a type of user environment of the infrastructure;

presence of a version of a user environment of the infrastructure; and presence of a collection of types of components of the infrastructure.

4. The method of claim 1, wherein the deployment manager determines the one or more actions to be excluded from being performed as part of the remediation for the infrastructure based further on the level of the risk tolerance that is assigned for the infrastructure of the deployments.

5. The method of claim 1, wherein a first portion of the number of actions comprises all remediation actions associated with conditionally exploitable vulnerabilities in a first group of the three groups.

6. The method of claim 5, wherein, as available computing resources allow, a remaining portion of the number of actions, separate from the first portion, comprises remediation actions associated with conditionally exploitable vulnerabilities in a second group of the three groups.

7. The method of claim 6, wherein one or more of the remediation actions included in the number of actions is selected based on computing resource limitations of another entity that participates in the remediation, the another entity being separate from the infrastructure.

8. The method of claim 1, wherein the conditionally exploitable vulnerabilities that are grouped in the exploitable vulnerabilities group of the three groups are known to be exploitable.

9. The method of claim 1, wherein the conditionally exploitable vulnerabilities that are grouped in the potentially exploitable vulnerabilities group of the three groups are vulnerabilities that are neither known to be exploitable nor known to not be exploitable based at least on the information available for use by the deployment manager during the classifying.

10. The method of claim 9, wherein the conditionally exploitable vulnerabilities are grouped in the potentially exploitable vulnerabilities group of the three groups due to lack of information regarding the conditions of the infrastructure necessary for a definitive determination regarding exploitability.

11. The method of claim 1, wherein the conditionally exploitable vulnerabilities that are grouped in the unexploitable vulnerabilities group of the three groups are vulnerabilities that are previously known to be unexploitable based at least on the information available for use by the deployment manager during the classifying.

12. A non-transitory machine-readable medium having instructions stored therein, which when executed by a processor, cause the processor to perform operations for managing deployments, the operations comprising:

identifying an infrastructure of the deployments for vulnerability analysis;

identifying components of the infrastructure;

identifying conditionally exploitable vulnerabilities based on the components;

identifying conditions of the infrastructure based on the conditionally exploitable vulnerabilities for the components;

classifying the conditionally exploitable vulnerabilities based on the conditions of the infrastructure to obtain an exploitable vulnerabilities hierarchy for the infrastructure by adding each conditionally exploitable vulnerability of the conditionally exploitable vulnerabilities to one of three groups, the three groups consisting of:

exploitable vulnerabilities exhibited by the infrastructure;

potentially exploitable vulnerabilities exhibited by the infrastructure; and unexploitable vulnerabilities exhibited by the infrastructure; and performing, using the deployments, a remediation for the infrastructure based on the exploitable vulnerabilities hierarchy, wherein the remediation is performed based on the exploitable vulnerabilities hierarchy for the deployment manager to exclude performance of one or more actions that waste limited computing resources of the deployments and the deployment manager as a result of the one or more actions being determined by the deployment manager, via using the exploitable vulnerabilities hierarchy and information available for use by the deployment manager during the classifying, as being unlikely to prevent at least one of the conditionally exploitable vulnerabilities within the exploitable vulnerabilities hierarchy from being exploited, wherein the one or more actions that are excluded for the remediation are associated with at least the conditionally exploitable vulnerabilities classified as the unexploitable vulnerabilities exhibited by the infrastructure, wherein a level of risk tolerance, for the infrastructure of the deployments, specifies one or more of the three groups that an entity associated with the infrastructure is willing to tolerate from being exploited, and wherein the deployment manager determines a number of actions to be executed in the remediation based on the level of the risk tolerance.

13. The non-transitory machine-readable medium of claim 12, wherein the conditionally exploitable vulnerabilities are vulnerabilities presented by the components when corresponding conditions are met.

14. The non-transitory machine-readable medium of claim 13, wherein the corresponding conditions comprise at least one selected from a group consisting of:

a version of one of the components of the infrastructure;

presence of a type of a component of the infrastructure;

presence of a type of user environment of the infrastructure;

presence of a version of a user environment of the infrastructure; and presence of a collection of types of components of the infrastructure.

15. The non-transitory machine-readable medium of claim 12, wherein the conditionally exploitable vulnerabilities that are grouped in the exploitable vulnerabilities group of the three groups are known to be exploitable.

16. The non-transitory machine-readable medium of claim 12, wherein the conditionally exploitable vulnerabilities that are grouped in the potentially exploitable vulnerabilities group of the three groups are vulnerabilities that are neither known to be exploitable nor known to not be exploitable based at least on the information available for use by the deployment manager during the classifying.

17. The non-transitory machine-readable medium of claim 16, wherein the conditionally exploitable vulnerabilities are grouped in the potentially exploitable vulnerabilities group of the three groups due to lack of information regarding the conditions of the infrastructure necessary for a definitive determination regarding exploitability.

18. The non-transitory machine-readable medium of claim 12, wherein the conditionally exploitable vulnerabilities that are grouped in the unexploitable vulnerabilities group of the three groups are vulnerabilities that are previously known to be unexploitable based at least on the information available for use by the deployment manager during the classifying.

19. A deployment manager for deployments, comprising:

a processor; and a memory coupled to the processor to store instructions, which when executed by the processor, cause the processor to perform operations for managing the deployment, the operations comprising:

identifying an infrastructure of the deployments for vulnerability analysis;

identifying components of the infrastructure;

identifying conditionally exploitable vulnerabilities based on the components;

identifying conditions of the infrastructure based on the conditionally exploitable vulnerabilities for the components;

classifying the conditionally exploitable vulnerabilities based on the conditions of the infrastructure to obtain an exploitable vulnerabilities hierarchy for the infrastructure by adding each conditionally exploitable vulnerability of the conditionally exploitable vulnerabilities to one of three groups, the three groups comprising:

exploitable vulnerabilities exhibited by the infrastructure;

potentially exploitable vulnerabilities exhibited by the infrastructure; and unexploitable vulnerabilities exhibited by the infrastructure; and performing, using the deployments, a remediation for the infrastructure based on the exploitable vulnerabilities hierarchy, wherein the remediation is performed based on the exploitable vulnerabilities hierarchy for the deployment manager to exclude performance of one or more actions that waste limited computing resources of the deployments and the deployment manager as a result of the one or more actions being determined by the deployment manager, via using the exploitable vulnerabilities hierarchy and information available for use by the deployment manager during the classifying, as being unlikely to prevent at least one of the conditionally exploitable vulnerabilities within the exploitable vulnerabilities hierarchy from being exploited, wherein the one or more actions that are excluded for the remediation are associated with at least the conditionally exploitable vulnerabilities classified as the unexploitable vulnerabilities exhibited by the infrastructure, wherein a level of risk tolerance, for the infrastructure of the deployments, specifies one or more of the three groups that an entity associated with the infrastructure is willing to tolerate from being exploited, and wherein the deployment manager determines a number of actions to be executed in the remediation based on the level of the risk tolerance.

20. The deployment manager of claim 19, wherein the conditionally exploitable vulnerabilities are vulnerabilities presented by the components when corresponding conditions are met.

* * * * *